US010243727B2

(12) United States Patent
Wu et al.

(10) Patent No.: US 10,243,727 B2
(45) Date of Patent: Mar. 26, 2019

(54) METHOD AND SYSTEM FOR CONSTANT TIME CRYPTOGRAPHY USING A CO-PROCESSOR

(71) Applicants: ATI Technologies ULC, Markham (CA); Advanced Micro Devices, Inc., Sunnyvale, CA (US)

(72) Inventors: Winthrop Wu, Shrewsbury, MA (US); James Goodman, Ottawa (CA); Martin Kiernicki, Acton, MA (US); Yoichi Shimokawa, Shrewsbury, MA (US); William Thomas Morrison, Sunnyvale, CA (US); Creighton Eldridge, Cambridge, MA (US); David Kaplan, Austin, TX (US)

(73) Assignees: ATI Technologies ULC, Markham, Ontario (CA); Advanced Micro Devices, Inc., Santa Clara, CA (US)

( * ) Notice: Subject to any disclaimer, the term of this patent is extended or adjusted under 35 U.S.C. 154(b) by 478 days.

(21) Appl. No.: 14/529,238

(22) Filed: Oct. 31, 2014

(65) Prior Publication Data
US 2016/0352509 A1    Dec. 1, 2016

Related U.S. Application Data

(60) Provisional application No. 61/898,257, filed on Oct. 31, 2013.

(51) Int. Cl.
*H04K 1/00* (2006.01)
*H04L 9/00* (2006.01)
(Continued)

(52) U.S. Cl.
CPC ............... *H04L 9/003* (2013.01); *G09C 1/00* (2013.01); *H04L 9/0631* (2013.01); *H04L 9/302* (2013.01);
(Continued)

(58) Field of Classification Search
CPC .......... H04L 2209/08; H04L 2209/125; H04L 9/0625; H04L 9/003; H04L 9/0631;
(Continued)

(56) References Cited

U.S. PATENT DOCUMENTS 6,658,578 B1 * 12/2003 Laurenti .................. G06F 5/01
712/244
2009/0097637 A1 * 4/2009 Boscher .................. G06F 7/723
380/28
(Continued)

*Primary Examiner* — Joseph P Hirl
*Assistant Examiner* — Sayed Beheshti Shirazi
(74) *Attorney, Agent, or Firm* — Faegre Baker Daniels LLP

(57) ABSTRACT

The present disclosure presents methods, apparatuses, and systems to bolster communication security, and more particularly to utilize a constant time cryptographic co-processor engine for such communication security. For example, the disclosure includes a method for secure communication, comprising receiving encrypted data at a receiving device; obtaining a randomization for at least one bit of the encrypted data; modifying an execution of a cryptographic algorithm on the at least one bit to obtain a randomized cryptographic algorithm based on the randomization; and executing the randomized cryptographic algorithm on the at least one bit of encrypted data to recover original data associated with the encrypted data.

6 Claims, 6 Drawing Sheets

(51) Int. Cl.
*G09C 1/00* (2006.01)
*H04L 9/06* (2006.01)
*H04L 9/30* (2006.01)

(52) U.S. Cl.
CPC ........ *H04L 9/3066* (2013.01); *H04L 2209/08* (2013.01)

(58) Field of Classification Search
CPC ......... H04L 9/302; H04L 9/3066; G09C 1/00; G06F 5/01; G06F 7/607; G06F 7/764; G06F 9/30014; G06F 9/30018
See application file for complete search history.

(56) References Cited

U.S. PATENT DOCUMENTS

| | | | |
|---|---|---|---|
| 2010/0318811 A1* | 12/2010 | Motoyama | G06F 7/00 713/190 |
| 2012/0072723 A1* | 3/2012 | Orsini | G06F 21/6209 713/165 |
| 2016/0147779 A1* | 5/2016 | Eguro | G06F 17/30082 707/694 |

* cited by examiner

METHOD AND SYSTEM FOR CONSTANT TIME CRYPTOGRAPHY USING A CO-PROCESSOR

RELATED APPLICATIONS

This application claims priority to Provisional Application Ser. No. 61/898,257, filed on Oct. 31, 2013, having inventors Winthrop Wu et al., titled "METHOD AND SYSTEM FOR CONSTANT TIME CRYPTOGRAPHY USING A CO-PROCESSOR", and is incorporated herein by reference.

FIELD OF THE DISCLOSURE

The present disclosure is generally related to communication security, and more particularly to methods and systems utilizing a constant time cryptographic co-processor engine for such communication security.

BACKGROUND

Secure communication of sensitive information between electronic devices over unsecured channels has become commonplace with the development of methods to encrypt and decrypt such sensitive information. Two broad categories of these encryption techniques are symmetric and asymmetric encryption, both of which are widely used today. Symmetric encryption involves the use of a secret key known by both a transmitter and receiver of sensitive information. Using the same secret key, the transmitter can encrypt the data and the receiver can decrypt the data upon receipt. One often-utilized example of symmetric encryption is the Advanced Encryption Standard (AES), which uses a series of key-specific processing steps to transform an input message into an encrypted message and a series of corresponding decryption steps to retrieve the original message at the receiver.

Asymmetric encryption, on the other hand, utilizes two related keys: a public key and a private key. The public key is universally available and may be utilized by any transmitting device who wishes to send sensitive information to a particular receiver. The private key, however, which is necessary to decrypt the data encrypted with the public key, is known only by the receiver. Thus, any message that is encrypted and transmitted using the public key may only be decrypted in a reasonable amount of time by the receiver that possesses the corresponding private key. One prevalent asymmetric encryption algorithm is the Rivest-Shamir-Adleman (RSA) algorithm, which utilizes modular exponentiation to generate the public and private keys needed for secure communication. Another popular asymmetric encryption scheme is Elliptic Curve Cryptography (ECC), which is based on the algebraic structure of elliptic curves and assumes that finding the discrete logarithm of an elliptic curve with respect to a public base point is infeasible to compute.

Though each of these methods of encryption and decryption have proven reliable, each is vulnerable to potential information leakage through side-channel attack methods. For a specific cryptographic algorithm being utilized, if the behavior of the algorithm can be monitored externally by a third party (e.g. a hacker), data-dependent behavior can be flagged and potentially used to determine the key or secret that the cryptographic algorithm is using. For example, during such a side-channel attack, one may attempt to hack a device to determine secret information by studying a timing profile, power consumption, electromagnetic field characteristics, or the like, associated with a computer device during encryption or decryption processes. Using such side-channel attack methods, a hacker may potentially glean valuable information regarding the start time of the execution of a cryptographic algorithm, the timing of ones and zeros in a secure communication, operation, and/or key, or any other information that would allow the hacker to more easily break a cipher and eventually gain access to secret data.

One such side-channel attack is referred to as a timing attack, wherein a third party seeks to recover leaked information regarding secret data based on the time necessary to complete an operation and/or or asymmetry between performing an operation on a one versus a zero. For example, to decrease the amount of time and resources necessary to perform an operation on one or more numbers (e.g., addition, multiplication) some systems may be configured to drop or otherwise ignore leading zeros inherent to one or more of the numbers of the operation. Thus, where two 1,000-digit numbers are being added and both of the numbers have 900 leading zeros, such an operation will take significantly less time to complete than an addition of two 1,000-digit numbers having no leading zeros if the adding system is configured to drop leading zeros. By monitoring the amount of time necessary to complete such an operation, a third party may garner some quantum of information regarding the original numbers of the operation. Aggregated over many operations, the third party may glean enough information from such timing attacks that it may recover a private key and decipher information communicated to or from the observed device using the obtained key.

BRIEF DESCRIPTION OF THE DRAWINGS

The embodiments will be more readily understood in view of the following description when accompanied by the below figures and wherein like reference numerals represent like elements.

DETAILED DESCRIPTION

Figure 1:
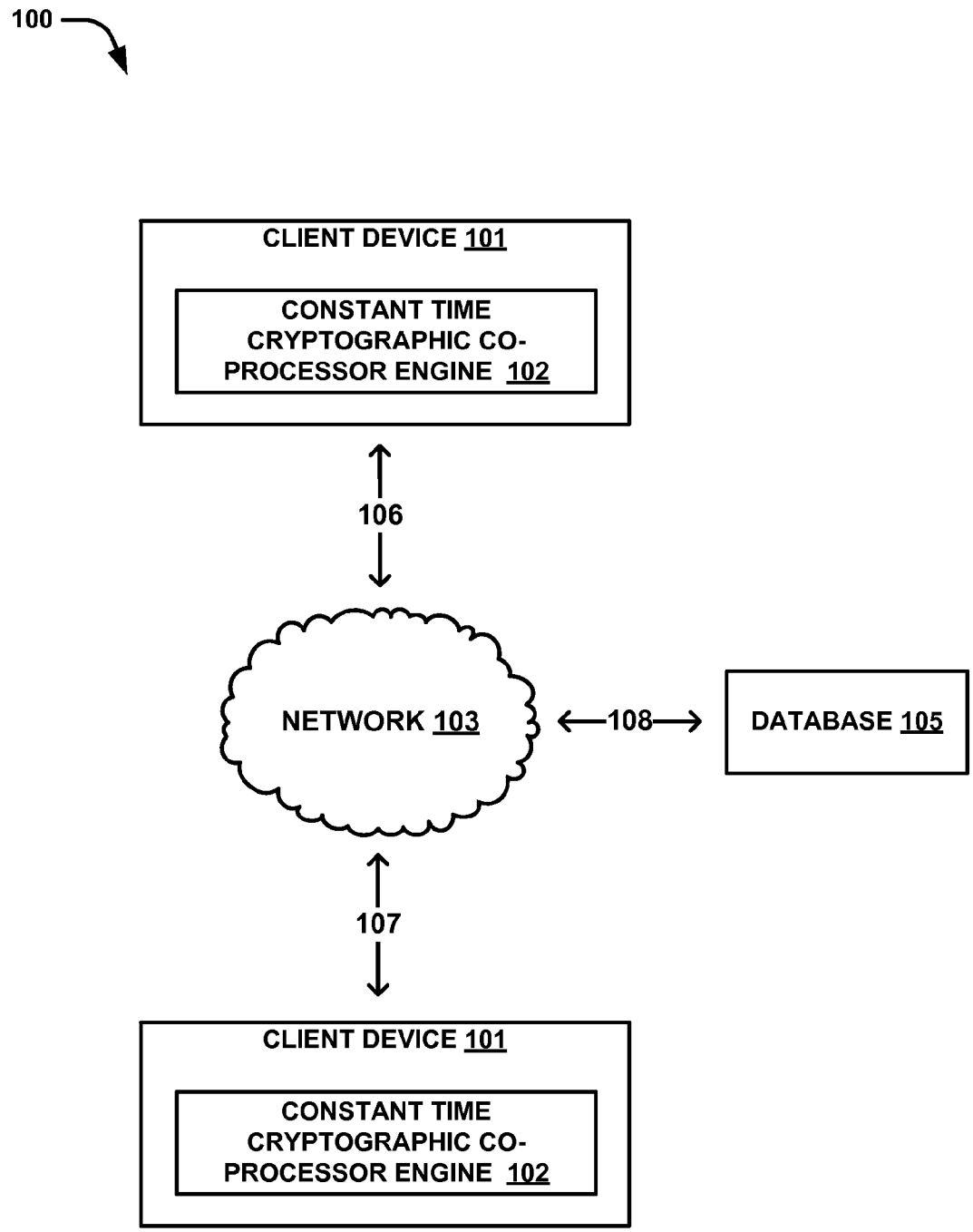
FIG. 1 is a block diagram of a communication system including one or more client devices that may communicate via a network.

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

The terminology "circuit" and "circuitry" refers generally to hardwired logic that may be implemented using various discrete components such as, but not limited to, diodes, bipolar junction transistors (BJTs), field effect transistors (FETs), etc., which may be implemented on an integrated circuit using any of various technologies as appropriate, such as, but not limited to CMOS, NMOS, etc.

The present disclosure presents methods and apparatuses for increased communication security using cryptographic algorithms that implement various forms of algorithmic randomization to prevent side-channel attacks. By introducing this randomization into the cryptographic algorithms executed, in some examples, by a cryptographic co-processor, data-dependent behavior in the implementation of the algorithm can be reduced and a relatively constant execution time can be achieved. For example, in an aspect, one or more dummy cycles may be randomly inserted into the execution of the cryptographic algorithm to provide a constant execution time regardless of the particular input data or key.

Consider AES, where the execution of an operation can traditionally take between eleven and fourteen cycles to complete. Because this inconsistent operation time signature may leave the system exposed to potential side-channel attacks, one or more dummy data paths may be inserted into the AES datapath and interleaved with genuine AES computations in order to provide a constant execution time of an AES operation. In an embodiment of the present disclosure, a randomization is introduced into the AES operation to randomly interleave the dummy and genuine operation cycles based on a random number, which may be generated by the cryptographic co-processor and appended to the message to be encrypted or decrypted as a random number header vector. In an example, for every 1 bit value in the random number header vector, a genuine cycle may be executed and for every 0 bit value in the random number header vector, a dummy cycle may be executed. Furthermore, because an AES operation may include up to fourteen clock cycles to complete depending on the length of the relevant key, where the random number header vector does not include at least fourteen 1 bit values to execute all of the genuine cycles, the random number header vector may be value inverted to ensure that a sufficient number of genuine cycles are executed.

In addition, the present disclosure introduces randomization elements into an RSA cryptographic algorithm implementation. During RSA implementation, exponentiation is performed, in some examples, using an exponentiation-by-squaring technique, which involves processing exponents on a per-bit basis. In previous attempts at implementing constant-time execution of the RSA algorithm, modular exponentiation processes iterated from an initial value that was data-dependent. Specifically, the RSA operation would drop any leading zeros of the binary representation of the exponent and would run a number of iterations equal to $MSB_{1BIT}-1$ where $MSB_{1BIT}$ represents the bit location of the most significant bit in the binary representation of the exponent having a value of 1. For example, for a 2048-bit RSA operation, if the most significant bit in the exponent is 1, then 2047 iterations of the exponentiation algorithm would be performed. However, where the most significant byte of the exponent is 0000_0011, then only 2041 iterations would be executed in the legacy RSA process due to the six leading zeros of the byte. This data-dependent discrepancy in RSA execution iterations represents data leakage.

Thus, in a non-limiting aspect of the present disclosure, a method and apparatus for randomly inserting dummy execution cycles into the RSA algorithm are presented to mask the true length of the exponent to third-party observers. In other words, a constant number of RSA iterations are performed regardless of the value of the exponent by interleaving dummy cycles with genuine cycles based on a random number, which may be generated by an encrypting or decrypting device and/or represented in a random number header vector appended to the encrypted data. In one aspect, some or all of the values in the random number header may be written to a shift register, such as a linear feedback shift register (LSFR), which may regulate the timing of dummy cycles vis-à-vis genuine cycles during RSA operation.

In an alternative or additional randomization of the RSA algorithm presented by the disclosure, a cryptographic co-processor may modify the traditional exponentiation processes of the RSA algorithm by performing a plurality of exponentiations based on an obtained random number. For example, an exponentiation performed during the RSA process may involve multiplying a number n by itself c times, or computing $n^c$. In an aspect presented herein, a random number with a value in the range of $1 \leq r \leq (c-1)$ may be generated and subtracted from c to give a second random exponent value s equal to c−r. Instead of evaluating $n^c$, the cryptographic processor may then perform two exponentiations based on the values of r and s and multiply the results of these exponentiations together to arrive at an overall exponentiation of n that is equal in value to the original $n^c$ value. In other words, rather than performing the original $n^c$ exponentiation, the cryptographic processor may compute $n^r n^s$, which introduces an element of randomization into the exponentiation through the r and s values such that information leakage is minimized as viewed by a potential third-party observer.

Furthermore, the present disclosure describes methods and apparatuses for introducing randomization into cryptographic algorithms using ECC, which utilize a plurality of point multiplications that implement multiplication via doubling. In such multiplicative operations, a multiplier known as a scalar is consumed one bit at a time from a least significant bit to a most significant bit, but leading or trailing zero value bits may be ignored in traditional implementations. Like the examples introduced in reference to AES and RSA above, in an aspect of the present disclosure, these dummy cycles may be interleaved with genuine cycles, with the number of dummy cycles equal to an amount of leading or trailing zeros and the execution timing of dummy cycles based on a generated random number, which may, in some aspects, be included in a header appended to encrypted data. In an additional or alternative aspect of the present disclosure, a cryptographic co-processor may generate one or more random numbers and may transform an ECC encryption or decryption process to an alternative coordinate system based on the one or more random numbers. By introducing one or more of these randomization methods into existing encryption schemes, a cryptographic co-processor and/or associated modules may limit the degree of information leakage associated with traditional encryption and decryption processes.

FIG. 1 presents a communication system 100 that may include one or more client devices 101, which may be configured to execute one or more cryptographic algorithms via a constant time cryptographic co-processor engine 102 during communication with another client device 101 or database 105. For example, during communication of data, one client device 101 may perform encryption of the data using a cryptographic algorithm and may transmit the encrypted data to another client device 101 and/or one or more databases 105 for subsequent retrieval by the receiving client device 101. The receiving client device 101 may be configured to execute a related cryptographic algorithm to decrypt the encrypted data. In an aspect, the one or more cryptographic algorithms for encrypting and/or decrypting the data may layer one or more randomization steps onto standardized cryptographic algorithms such as, but not limited to, AES, RSA, ECC, symmetric or asymmetric cryptographic schemes, or any other cryptographic algorithm. In addition, one or more client devices 101 may communicate via network 103 over communication links 106, 107, and/or 108, which may be wireless links, wired links, or a combination thereof, and may use one or more communications networks (e.g. network 103) to facilitate this communication and/or multimedia access. In some examples, communication links 106, 107, and/or 108 may be unsecure or secure communication links.

Furthermore, communications links 106, 107, and/or 108 may comprise other telecommunication systems and networks, network architectures, and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the communication system 100.

Additionally, network 103 may include an access network and/or core network, and may include any network type, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. In addition, network 103 may comprise one or more network devices for storing and delivering data to one or more client devices 101. Furthermore, the one or more network devices of network 103 may include one or more storage devices for storing such content, which, in some examples, may include database 105. In some examples, database 105 may internal or external to network 103 and may comprise any device capable of storing encrypted or unencrypted communication data, such as a server or any other remote data storage device. In addition, network 103 may include one or more of any type of network device, entity, or module, such as an access point, a macro cell, including a base station (BS), node B, eNodeB (eNB), a relay, a peer-to-peer device, an authentication, authorization and accounting (AAA) server, a mobile switching center (MSC), a radio network controller (RNC), or a low-power access point, such as a picocell, femtocell, microcell, etc.

Moreover, each of the one or more client devices 101 may include one or more devices configured to obtain, encrypt, transmit, and/or decrypt data communicated via network 103. In an aspect, the client devices 101 may each include a gaming console, personal computer, such as a desktop computer, laptop computer, tablet, set-top box (e.g. connected to a display or television), or other computing device, which may include a processing device or one or more processing modules for executing one or more instructions stored on a computer-readable medium. Furthermore, the one or more user terminals may include one or more mobile devices, which may be known to those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Figure 2:
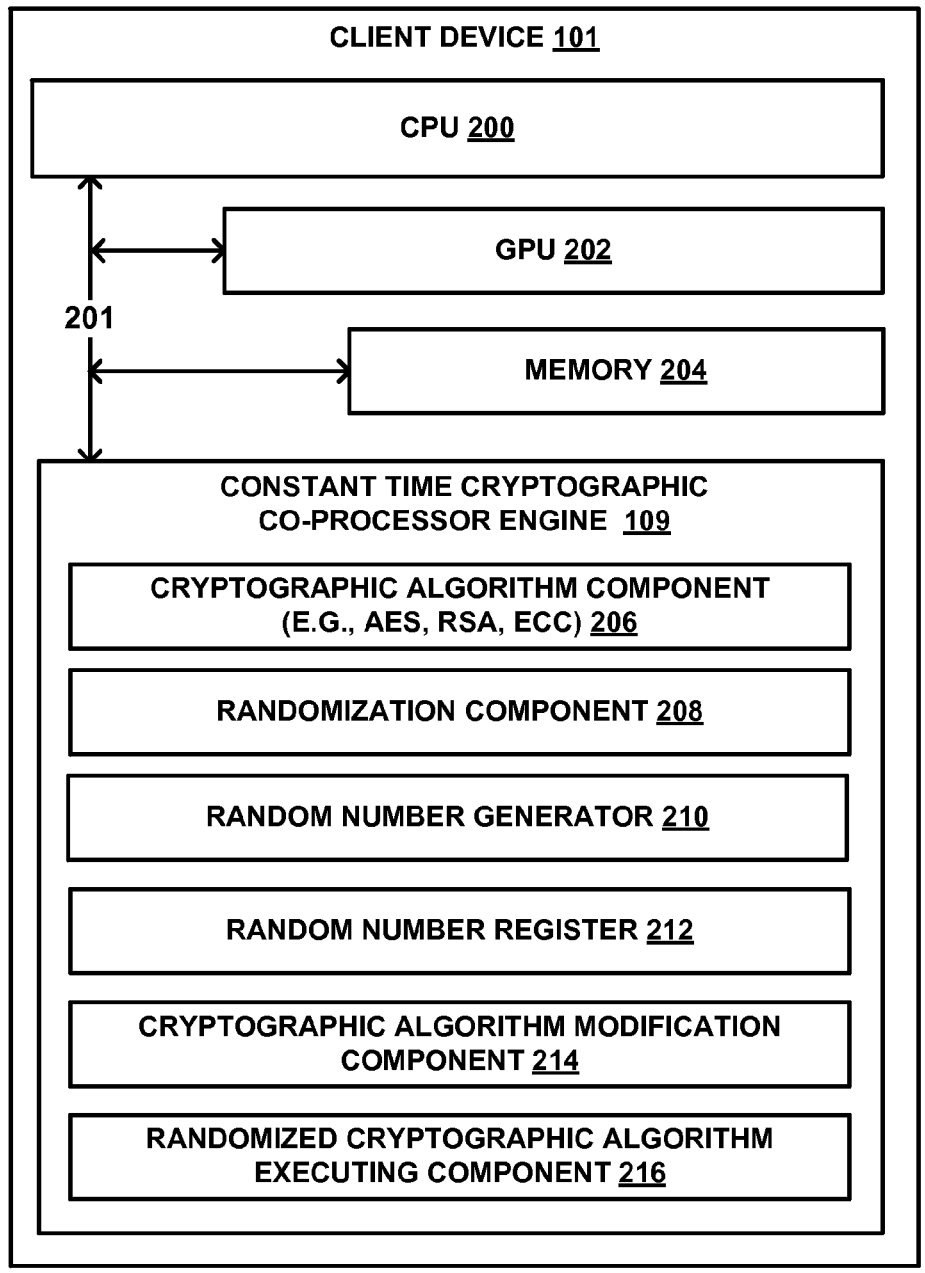
FIG. 2 is a block diagram of an example client device configured to execute a randomized cryptographic algorithm.

FIG. 2 illustrates an example client device 101 according the present disclosure, which may include a constant time cryptographic co-processor engine 109 configured to introduce randomization into the execution of one or more cryptographic algorithms to minimize the potential for side-channel attacks during encryption or decryption of data. Client device 101 may include one or more processing modules, which may include one or more processors that are configured to execute instructions for performing one or more functions, including cryptographic algorithms. For example, client device 101 may include a central processing unit (CPU) 200, which may be a processor for executing processing functions associated with one or more modules and functions of the client device 101. CPU 200, for example, may execute processing functions according to unencrypted data, which may be input to CPU 200 from constant time cryptographic co-processor engine 109 via bus 201. Furthermore, client device 101 may include a graphics processing unit (GPU) 202, which may be configured to process instructions and/or manipulate data in memory 204 related to generating and outputting imagery to one or more peripheral display devices associated with client device 101. For example, where client device 101 comprises a gaming console, GPU 202 may communicate with CPU 200 and memory 204 to produce images that may be output to a peripheral display device.

In addition, constant time cryptographic co-processor engine 109 may include or comprise an additional processor, or "co-processor," or may, in some non-limiting embodiments, be integral to CPU 200. Constant time cryptographic co-processor engine 109 may include one or more components configured to execute randomized cryptographic algorithms for encrypting or decrypting data in a way that bolsters the security and secrecy of the cryptographic algorithms executed and the data and keys utilized in the cryptographic algorithms. In some examples, such randomization may include layering additional or alternative steps on existing cryptographic algorithms, or may include original, randomized cryptographic algorithms based on existing cryptographic algorithms. For example, constant time cryptographic co-processor engine 109 may include a cryptographic algorithm component 206, which may be configured to house one or more cryptographic algorithms and/or the additional or alternative steps associated with the randomization of the cryptographic algorithms in software, hardware, or a combination of software and hardware. As such, cryptographic algorithm component 206 may include software and/or hardware configured to execute AES, RSA, and/or ECC cryptographic algorithms as well as additional or alternative randomization steps contemplated herein.

Furthermore, constant time cryptographic co-processor engine 109 may include a randomization component 208, which may be configured to obtain a randomization that can be applied to the execution of a cryptographic algorithm (e.g., AEC, RSA, ECC, etc.) to mitigate the negative effects of information leakage that may be associated with a side-channel attack. In some examples, randomization component 208 may base a randomization on one or more random numbers that may control the timing and frequency of one or more dummy cycles that may be randomly inserted into the execution of the cryptographic algorithm to form a randomized cryptographic algorithm. This random number may be generated by a random number generator 210, which may be configured to generate a random number and/or a binary representation of the random number. Alternatively, the random number may be obtained by randomization component 208 via a multi-bit random number header or header vector appended to encrypted data received in the course of a communication or retrieved from remote or internal memory 204. In an additional aspect constant time cryptographic co-processor engine 109 may include a random number register that may be configured to store the binary values of the obtained random number. Additionally, random number register 212 may be a shift register, such as a linear feedback shift register (LFSR), or any other type of register known to one or ordinary skill in the art.

Furthermore, in some examples, the random number register 212 may have an associated counter or other hardware module that may have a width equal to the binary representation of the random number. When decrypting or encrypting data according to aspects of the present disclosure, constant time cryptographic co-processor engine 109 (e.g., via randomized cryptographic algorithm executing component 216) may read a register value from random number register 212 and may execute a dummy cycle using dummy data and/or a dummy key where the register bit value equals zero and may execute a genuine cycle where the register bit value equals one (or vice versa). This interleaving of one or more dummy cycles with one or more genuine cycles based on the binary representation of an obtained random number may be implemented by constant time cryptographic co-processor engine 109 when implementing any cryptographic algorithm, including AES, RSA, ECC, or any other cryptographic algorithm. However, one or more applied randomizations may be cryptographic algorithm-specific, as described below in reference to randomized cryptographic algorithm executing component 216. For example, randomization component 208 may utilize a random number to perform a modified exponentiation process during execution of a modified RSA algorithm and/or to perform a random coordinate system transformation process during execution of a modified ECC algorithm.

Additionally, constant time cryptographic co-processor engine 109 may include a cryptographic algorithm modification component 214, which may be configured to generate modifications that add, alter, or otherwise modify a cryptographic algorithm, including, but not limited to, AES, RSA, or ECC algorithms, by introducing one or one randomization steps into the encryption or decryption process. In an aspect, these modifications may be added to or swapped for one or more steps of a traditional cryptographic algorithm stored in cryptographic algorithm component 206 to generate a randomized cryptographic algorithm. Furthermore, constant time cryptographic co-processor engine 109 may include a randomized cryptographic algorithm executing component 214, which may be configured to execute the randomized cryptographic algorithm that includes the modifications generated by cryptographic algorithm modification component, which may be cryptographic algorithm-specific.

For example, the randomized cryptographic algorithm generated by the cryptographic algorithm modification component 214 and executed by the randomized cryptographic algorithm executing component 216 may be based on AES, RSA, or ECC algorithms, but may include one or more modifications. These modifications may introduce a randomization generated by randomization component into these individual cryptographic algorithms to ensure a constant run-time of the randomized cryptographic algorithm, regardless of the input data to be encrypted or decrypted or the key or keys used for the encryption or decryption, thus minimizing the potential for information leakage due to side channel attacks.

In some embodiments, the randomized cryptographic algorithm may be based on an AES algorithm. In such an embodiment, randomized cryptographic algorithm executing component 216 may be configured to execute a genuine AES decryption or encryption cycle on at least one bit of data where a bit value of the random number obtained from random number register 212 has a value of one and executing a dummy cycle on dummy data where the bit value of the random number has a value of zero. In this way, the random number may serve as a vehicle for randomly interleaving dummy cycles and genuine cycles to force randomized cryptographic algorithm executing component 216 to constantly execute some form of encryption or decryption process such that, when externally viewed or monitored by a third party, the execution time associated with the randomized cryptographic algorithm execution component appears to be data independent and constant.

In an example, in executing a randomized AES-based cryptographic algorithm, randomized cryptographic algorithm executing component 216 may be configured to determine a number of bit values of the random number or a received random number header vector having a value of 1 (or 0, depending on which value represents the execution of a genuine cycle in a particular embodiment). To ensure that a sufficient number of genuine cycles are executed based on the random number, the randomized cryptographic algorithm executing component 216 may determine whether the number of bit values having the value of 1 (or 0, in other embodiments) is less than a threshold number equal to the number of necessary genuine cycles. Furthermore, randomized cryptographic algorithm executing component 216 may be configured to bit-invert the bits of the random number (or random number header vector) where the number of bit values of the random number having a value of 1 (or 0) is less than a threshold number. By doing so, a bit-inverted random number is obtained that includes enough bit values of 1 (or 0) to ensure that the necessary number of genuine cycles are executed by randomized cryptographic algorithm executing component 216. This may involve randomized cryptographic algorithm executing component 216 replacing the random number with the bit-inverted random number before executing the randomized cryptographic algorithm. For example, because an AES operation may include up to fourteen clock cycles to complete depending on the length of the relevant key, where the random number header vector or random number retrieved from random number register 212 does not include at least fourteen 1 bit values to execute all of the genuine cycles, the random number header vector may be bit-value inverted to ensure that a sufficient number of genuine cycles are executed.

In addition, constant time cryptographic co-processor engine 109 may be configured to execute a randomized cryptographic algorithm to encrypt or decrypt data based on the RSA algorithm. During RSA implementation, randomized cryptographic algorithm executing component 216 may perform exponentiation, in some examples, using an exponentiation-by-squaring technique, which involves processing exponents on a per-bit basis. In an aspect, cryptographic algorithm modification component 214 may randomly insert dummy execution cycles into the RSA algorithm to mask the true length of the exponent and any input data or key values to potential third-party observers. Thus, like the implementation described above in relation to the example AES embodiment, a constant number of RSA iterations are performed by the randomized cryptographic algorithm executing component 216 regardless of the value of the exponent by interleaving dummy cycles with genuine cycles based on a random number, which may be generated and stored by random number generator 210 and random number register 212, respectively.

Additionally or alternatively, cryptographic algorithm modification component 214 may modify the traditional exponentiation processes of the RSA algorithm by splitting an exponent value into multiple values during an exponentiation procedure of the traditional RSA algorithm based on a random number. The randomized cryptographic algorithm executing component may then execute a plurality of exponentiations based on the multiple values created based on the obtained random number. For example, an exponentiation performed during the traditional RSA process may involve multiplying a number n by itself c times, or computing $n^c$. In an example embodiment of constant time cryptographic co-processor engine 109, a random number with a value in the range of $1 \leq r \leq (c-1)$ may be generated by random number generator 210 and subtracted from c to give a second random exponent values equal to c−r. Instead of evaluating $n^c$, randomized cryptographic algorithm executing component 216 may then perform two exponentiations based on the values of r and s and multiply the results of these exponentiations together to arrive at an overall exponentiation of n that is equal in value to the original $n^c$ value. In other words, rather than performing the original $n^c$ exponentiation, randomized cryptographic algorithm executing component 216 may compute $n^r n^s$, which introduces an element of randomization into the exponentiation through the r and s values such that information leakage is minimized as viewed by a potential third-party observer.

Moreover, constant time cryptographic co-processor engine 109 may be configured to perform one or more randomized cryptographic algorithms utilizing a randomized modification of ECC. In some examples, the random-number-based interleaving of dummy cycles and genuine cycles described above in relation to the randomized AES and RSA processes may be similarly performed where the constant time cryptographic co-processor engine 109 encrypts or decrypts data based on ECC algorithms.

In alternative or additional embodiments, cryptographic algorithm modification component 214 may introduce a randomization into the ECC algorithm by transforming a coordinate system in which one or more ECC computations are performed. For example, in an aspect, at least one random number value may be obtained from random number generator 210 or random number register 212. Furthermore, cryptographic algorithm modification component 214 may be configured to modify one or more steps of the ECC algorithm by transforming an elliptic curve in an original coordinate system into a transformed elliptic curve in a modified coordinate system using randomized coordinate values based on the at least one random number value. In traditional ECC algorithms, computations are often performed based on Jacobian coordinate systems. In an aspect, cryptographic algorithm modification component 214 may, based on a random number, transform a elliptical curve and/or coordinate system upon which ECC algorithm computations are based when executed by randomized cryptographic algorithm component 216. In an additional aspect, randomized cryptographic algorithm executing component 216 may, once one or more ECC computations are executed in the transformed coordinate system, modify the result of the ECC algorithm to the original coordinate system.

Figure 3:
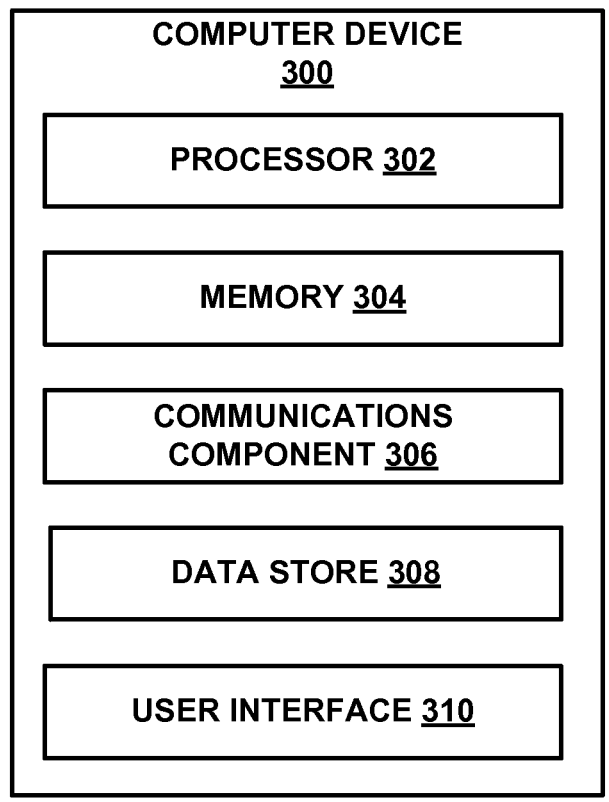
FIG. 3 is a block diagram of a general computer device according to the present disclosure.

Referring to FIG. 3, in one aspect, any of client devices 101, database 103, and any network entity of network 103 of FIG. 1, or any of the components therein, may be represented by a specially programmed or configured computer device 300. Computer device 300 includes a processor 302 for carrying out processing functions associated with one or more of modules and functions described herein. Processor 302 can include a single or multiple set of processors or multi-core processors. Moreover, processor 302 can be implemented as an integrated processing system and/or a distributed processing system.

Computer device 300 further includes a memory 304, such as for storing data used herein and/or local versions of applications being executed by processor 302. Memory 304 can include any type of memory usable by a computer, such as random access memory (RAM), read only memory (ROM), tapes, magnetic discs, optical discs, volatile memory, non-volatile memory, and any combination thereof.

Further, computer device 300 includes a communications module 306 that provides for establishing and maintaining communications with one or more parties utilizing hardware, software, and services as described herein. Communications module 306 may carry communications between modules on computer device 300, as well as between computer device 300 and external devices, such as devices located across a communications network and/or devices serially or locally connected to computer device 300. For example, communications module 306 may include one or more buses, and may further include transmit chain modules and receive chain modules associated with a transmitter and receiver, respectively, or a transceiver, operable for interfacing with external devices.

Additionally, computer device 300 may further include a data store 308, which can be any suitable combination of hardware and/or software, that provides for mass storage of information, databases, and programs employed in connection with aspects described herein. For example, data store 308 may be a data repository for applications not currently being executed by processor 302.

Computer device 300 may additionally include a user interface module 310 operable to receive inputs from a user of computer device 300, and further operable to generate outputs for presentation to the user. User interface module 310 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 310 may include one or more output devices, including but not limited to a display, a speaker, a haptic feedback mechanism, a printer, any other mechanism capable of presenting an output to a user, or any combination thereof. In an additional aspect, computer device 300 may include or may communicate with the constant time cryptographic co-processor engine 102 of FIGS. 1 and 2.

Figure 4:
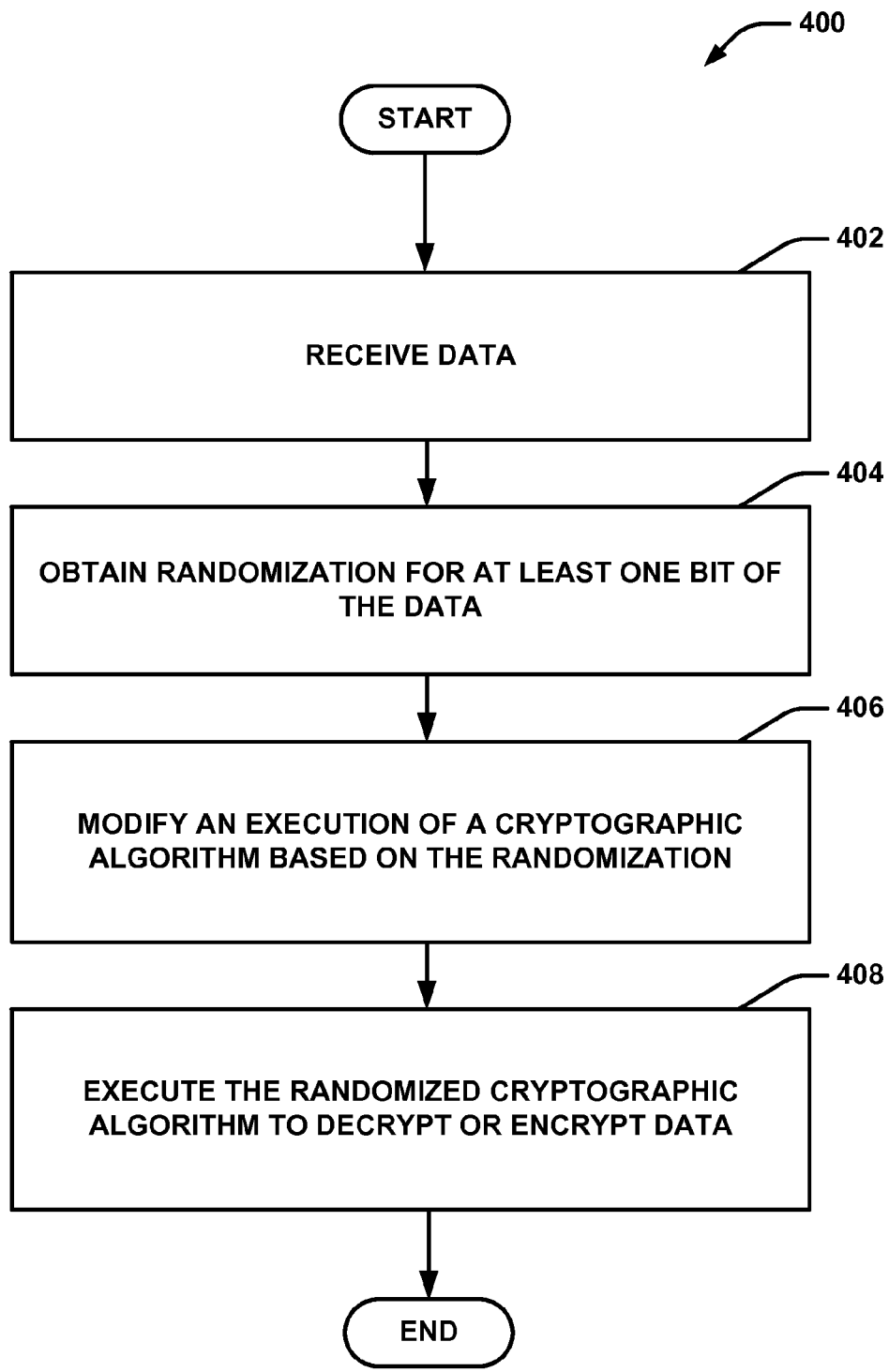
FIG. 4 is a flow chart of an exemplary method of generating and executing a randomized cryptographic algorithm.

Turning to FIG. 4, an example methodology 400 for executing a modified cryptographic algorithm to minimize information leakage is presented in a series of steps, which may be performed by one or more components of client device 101 of FIGS. 1 and 2. Though the series of steps are presented in a particular order, the presented order is non-limiting. In an aspect, at block 402, methodology 400 may include receiving data to be encrypted or decrypted. Receiving the data may include receiving an encrypted message from a transmitting device and/or receiving data from an internal component on a device that is to be encrypted by the device. Furthermore, at block 404, methodology 400 may include obtaining a randomization for at least one bit of the data, which may include generating or otherwise obtaining a random number upon which the randomization may be based. Additionally, at block 406, methodology 400 may include modifying an execution of a cryptographic algorithm (e.g. AES, RSA, ECC, etc.) based on the randomization. In an example, the modification may include interspersing one or more dummy cycles with one or more genuine cycles to arrive at a randomized cryptographic algorithm to encrypt or decrypt the received data with a constant run time that is data and key independent. In addition, methodology 400 may include, at block 408, executing the randomized cryptographic algorithm to decrypt or encrypt the data.

Figure 5:
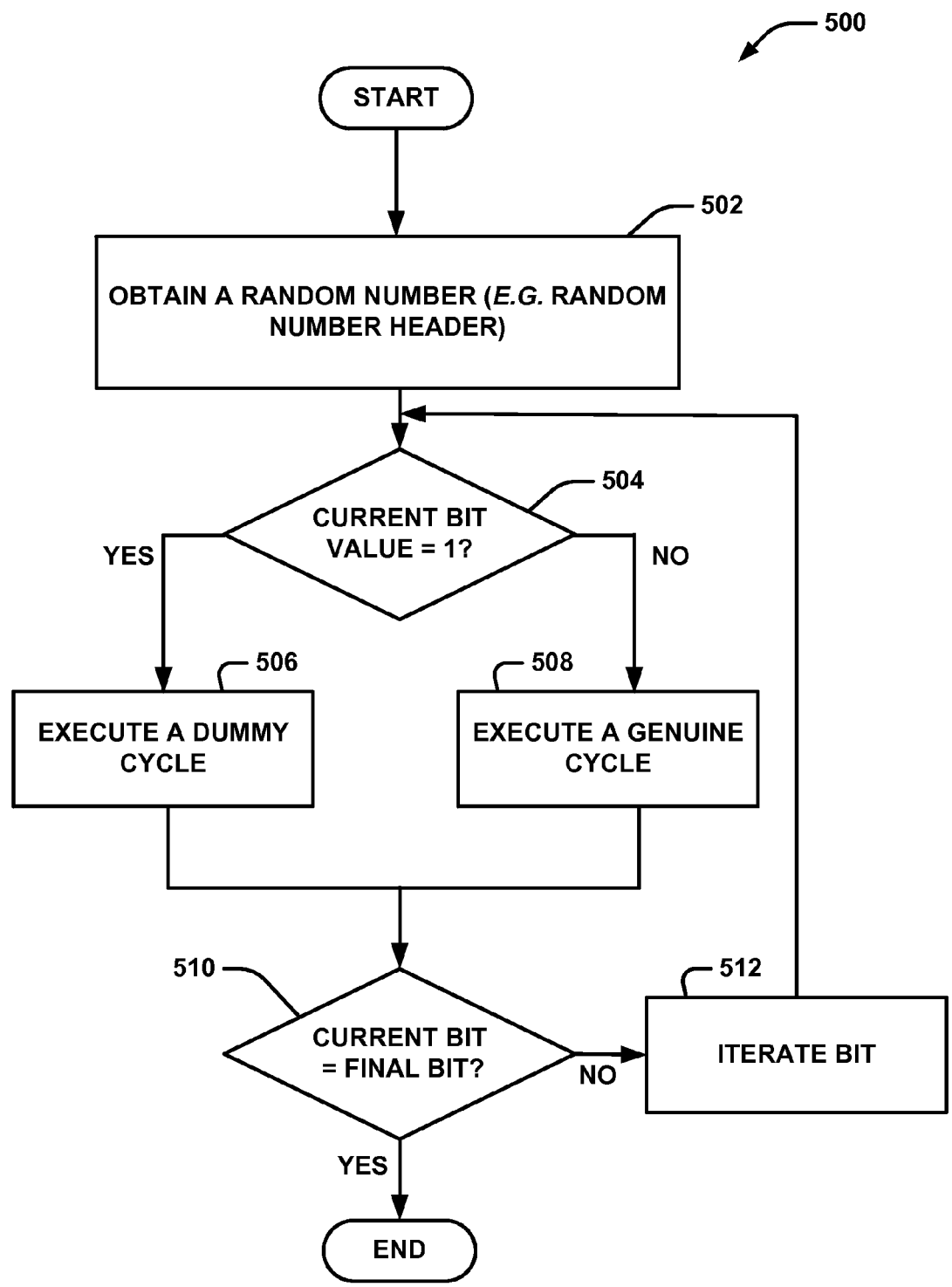
FIG. 5 is a flow chart of an exemplary method of interleaving one or more dummy cycles with one or more genuine cycles based on a random number.

FIG. 5 presents a further methodology 500 for executing a modified and randomized cryptographic algorithm by interspersing one or more dummy cycles with one or more genuine cycles of a cryptographic algorithm (e.g. AES, RSA, ECC, etc.) based on a random number. In an aspect, methodology 500 may include, at block 502, obtaining a random number, which may be generated by a random number generator or received in a random number header vector appended to data. Methodology 500 may further include iterating through the binary representation of the random number on a bit-by-bit basis and executing a dummy cycle for one bit value (1 or 0) and executing a genuine cycle for the inverse bit value (0 or 1). For purposes of FIG. 5, the example methodology 500 assumes that a dummy cycle is executed for each bit value of 1 in the random number up to a number of dummy cycles needed for a particular data or key being decrypted or encrypted, but a value of 0 may indicate the execution of a dummy cycle in alternative embodiments. In some examples, this number of dummy cycles needed may equal a number of leading and/or trailing zeros of a particular data set being encrypted or decrypted.

As such, methodology 500 may include, at block 504, determining whether a current bit value of the random number is 1. Where the current bit value is 1, a dummy cycle may be executed at block 506. Alternatively, where the current bit value is 0, a genuine cycle may be executed. Furthermore, at block 510, methodology 500 may include determining whether the current bit is a final bit. In an aspect, the final bit may comprise a last bit of the random number. In other examples, the final bit may comprise a bit wherein a number of dummy cycles performed is equal to a number of leading zeros of the data being encrypted or decrypted. Where the current bit equals the final bit, methodology 500 may exit and where the current bit does not equal the final bit, the methodology may further include iterating the bit to a next bit in the random number at block 512, and the methodology 500 may resume on the next bit of the random number.

Figure 6:
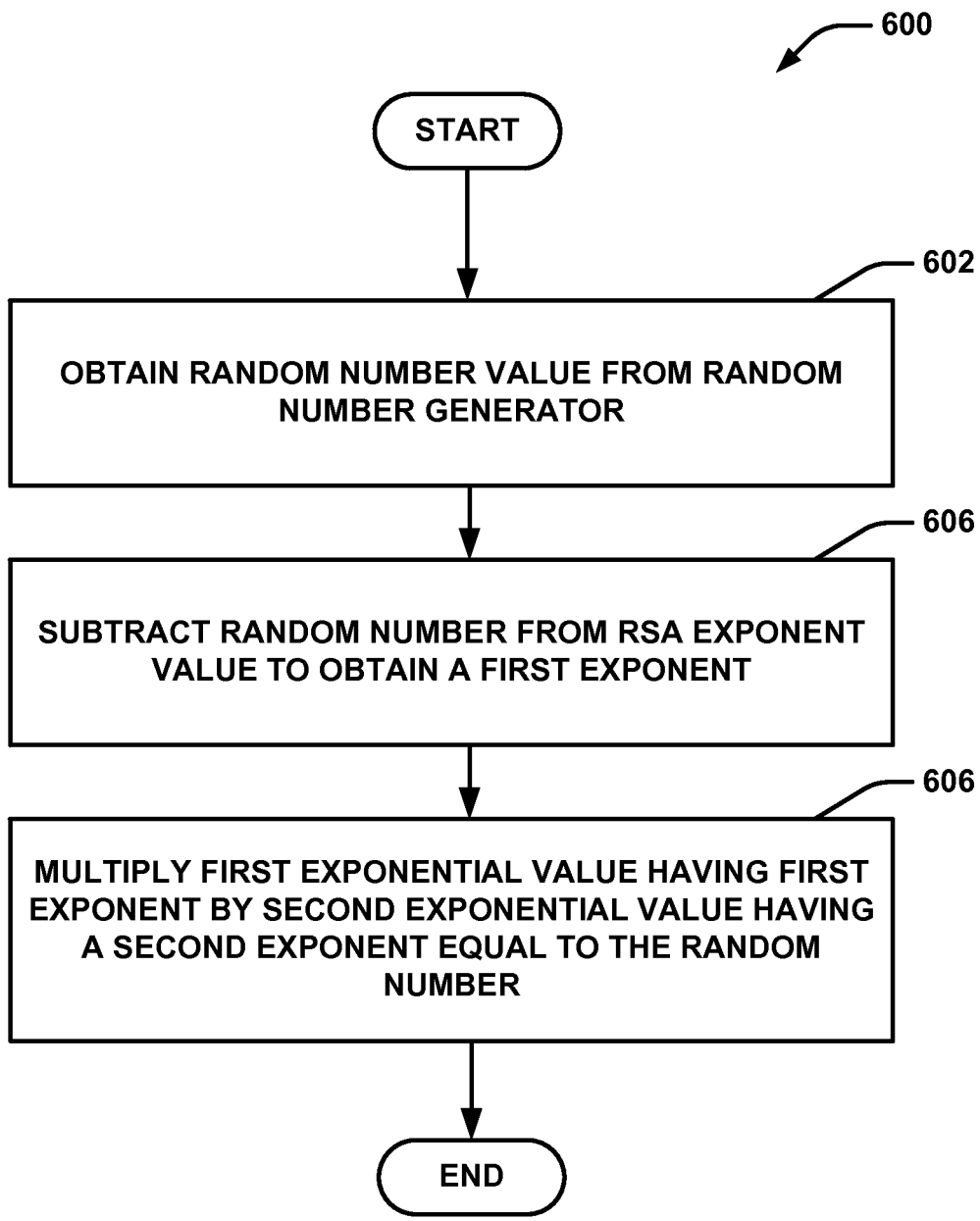
FIG. 6 is a flow chart of an exemplary method of performing randomized exponentiation during a randomized cryptographic algorithm based on the RSA algorithm.

FIG. 6 presents an example methodology 600 for introducing a randomization into an execution of an RSA algorithm for minimizing information leakage during exponentiation. In an example, at block 602, methodology 600 may include obtaining a random number value from a random number generator (or a random number vector appended to data). For example, an exponentiation performed during the traditional RSA process may involve multiplying a number n by itself c times, or computing $n^c$, where c represents the RSA exponent value. In such an example embodiment, the random number r may be forced to have a value in the range of $1 \leq r \leq (c-1)$. Further, at block 606, methodology 600 may further include subtracting the random number r from the RSA exponent value c to obtain a first exponent s. Instead of evaluating $n^c$ via a single exponentiation step, methodology may include, at block 606, multiplying the first exponential value $n^s$ having first exponent s by a second exponential value $n^r$ having a second exponent r equal to the random number. In other words, block 606 may involve performing two exponentiations based on the values of r and s and multiply the results of these exponentiations together to arrive at an overall exponentiation of n that is equal in value to the original $n^c$ value. Thus, rather than performing the original $n^c$ exponentiation, methodology 600 may involve computing $n^r n^s$, which introduces an element of randomization into the exponentiation through the r and s values such that information leakage is minimized as viewed by a potential third-party observer.

Also, integrated circuit fabrication systems (e.g., wafer fabrication system) are known that create wafers with integrated circuits based on executable instructions stored on a computer readable medium such as but not limited to CDROM, RAM, other forms of ROM, hard drives, distributed memory, etc. are produced by an integrated circuit design system (e.g., work station). The instructions may be represented by any suitable language such as but not limited to hardware descriptor language (HDL), Verilog or other suitable language. As such, the logic and circuits described herein may also be produced as integrated circuits by such fabrication systems using the non-transitory computer readable medium with instructions stored therein. For example, an integrated circuit with the aforedescribed logic and structure may be created using such integrated circuit fabrication systems. The computer readable medium stores instructions executable by one or more integrated circuit design systems that causes the one or more integrated circuit design systems to fabricate an integrated circuit. The designed integrated circuit includes a constant time cryptographic co-processor, comprising a communications component configured to receive encrypted data at a receiving device, a randomization component configured to obtain a randomization for at least one bit of the encrypted data; a cryptographic algorithm modification component configured to modify an execution of a cryptographic algorithm on the at least one bit to obtain a randomized cryptographic algorithm based on the randomization; and a randomized cryptographic algorithm executing component configured to execute the randomized cryptographic algorithm on the at least one bit of encrypted data to recover original data associated with the encrypted data. The fabricated integrated circuit may also include the other aspects described herein.

While the embodiments have been described as having preferred designs, the disclosed embodiments can be further modified within the spirit and scope of this disclosure. This application is therefore intended to cover any variations, uses, or adaptations of the embodiments using its general principles. Further, this application is intended to cover such departures from the present disclosure as come within known or customary practice in the art to which this disclosure pertains and which fall within the limits of the appended claims.

What is claimed is:

1. A method for secure communication, comprising:
receiving encrypted data at a receiving device;
obtaining a random number by the receiving device, for at least one bit of the encrypted data;
modifying, by the receiving device, an execution of an Rivest-Shamir-Adleman (RSA) cryptographic algorithm on the at least one bit to obtain a randomized cryptographic algorithm based on the obtained random number wherein modifying the execution of a cryptographic algorithm further comprises:
determining a number of leading zeros of the encrypted data;
inserting a number of dummy cycles equal to the number of leading zeros into the execution of the cryptographic algorithm;
decrypting the encrypted data by executing the randomized cryptographic algorithm on the at least one bit of encrypted data to recover original data associated with the encrypted data, comprising:
subtracting the random number from an RSA exponent value to obtain a first exponent; and
multiplying a first exponential value having the first exponent by a second exponential value having a second exponent equal to the random number.

2. A method for secure communication, comprising:
receiving encrypted data at a receiving device;
obtaining, by the receiving device, a random number from a random number generator in the receiving device for at least one bit of the encrypted data;
configuring a processor, using the random number, by the receiving device, to modify an execution of an Elliptic Curve Cryptography (ECC) cryptographic algorithm on the at least one bit to obtain a randomized cryptographic algorithm based on the random number;
decrypting, by the processor, the encrypted data by executing the randomized cryptographic algorithm on the at least one bit of encrypted data to recover original data associated with the encrypted data, comprising:
transforming an elliptic curve in an original coordinate system into a transformed elliptic curve in a modified coordinate system using randomized coordinate values based on the at least one random number value;
performing the ECC algorithm using the transformed elliptic curve; and
modifying a result of the ECC algorithm to the original coordinate system;
executing a number of dummy cycles during the execution of the cryptographic algorithm, wherein the number of dummy cycles is based on a number of zeros of a scalar associated with one or more multiplication operations of the cryptographic algorithm.

3. An apparatus, comprising:
a central processing unit;
a memory;
a constant time cryptographic co-processor, operatively coupled to the central processing unit and the memory, comprising:
a communications component configured to receive encrypted data;
a randomization component configured to obtain a random number for at least one bit of the encrypted data;
a cryptographic algorithm modification component configured to:
use the random number to modify an execution of an Rivest-Shamir-Adleman (RSA) cryptographic algorithm on the at least one bit to obtain a randomized cryptographic algorithm wherein the cryptographic algorithm modification component is further configured to:
determine a number of leading zeros of the encrypted data;
insert a number of dummy cycles equal to the number of leading zeros into the execution of the cryptographic algorithm; and
subtract the random number from an RSA exponent value to obtain a first exponent; and
a randomized cryptographic algorithm executing component configured to decrypt the encrypted data by:
executing the randomized cryptographic algorithm on the at least one bit of encrypted data to recover original data, for use by the central processing unit, associated with the encrypted data; and
multiplying a first exponential value having the first exponent by a second exponential value having a second exponent equal to the random number.

4. An apparatus, comprising:
a central processing unit;
a memory;
a constant time cryptographic co-processor, operatively coupled to the central processing unit and the memory, comprising:
a communications component configured to receive encrypted data;
a randomization component configured to obtain a random number for at least one bit of the encrypted data;
a cryptographic algorithm modification component, of the constant time cryptographic co-processor, configured to:
use the random number to modify an execution of an Elliptic Curve Cryptography (ECC) cryptographic algorithm on the at least one bit to obtain a randomized cryptographic algorithm; and
transform an elliptic curve in an original coordinate system into a transformed elliptic curve in a modified coordinate system using randomized coordinate values based on the at least one random number value; and
a randomized cryptographic algorithm executing component, of the constant time cryptographic co-processor, configured to:
decrypt the encrypted data by executing the randomized cryptographic algorithm on the at least one bit of encrypted data to recover original data, for use by the central processing unit, associated with the encrypted data;
perform the ECC algorithm using the transformed elliptic curve; and
modify a result of the ECC algorithm to the original coordinate system;
wherein the randomized cryptographic algorithm executing component is configured to execute a number of dummy cycles during the execution of the cryptographic algorithm, wherein the number of dummy cycles is based on a number of zeros of a scalar associated with one or more multiplication operations of the cryptographic algorithm.

5. A non-transitory storage medium that comprises executable instructions thereon that when executed by an integrated circuit fabrication system, causes the system to form an integrated circuit that comprises a constant time cryptographic co-processor, comprising:
- a communications component configured to receive encrypted data;
- a randomization component configured to obtain a random number for at least one bit of the encrypted data from a random number generator;
- a cryptographic algorithm modification component configured to: use the random number to modify an execution of an Rivest-Shamir-Adleman (RSA) cryptographic algorithm on the at least one bit to obtain a randomized cryptographic algorithm based on the random number wherein the cryptographic algorithm modification component is further configured to:
- determine a number of leading zeros of the encrypted data;
- insert a number of dummy cycles equal to the number of leading zeros into the execution of the cryptographic algorithm;
- a randomized cryptographic algorithm executing component configured to: decrypt the encrypted data by executing the randomized cryptographic algorithm on the at least one bit of encrypted data to recover original data associated with the encrypted data, comprising:
- subtracting the random number from an RSA exponent value to obtain a first exponent; and
- multiplying a first exponential value having the first exponent by a second exponential value having a second exponent equal to the random number.

6. A non-transitory storage medium that comprises executable instructions thereon that when executed by an integrated circuit fabrication system, causes the system to form an integrated circuit that comprises a constant time cryptographic co-processor, comprising:
- a communications component configured to receive encrypted data;
- a randomization component configured to obtain a random number for at least one bit of the encrypted data;
- a cryptographic algorithm modification component, of the constant time cryptographic co-processor, configured to: use the random number to modify an execution of an Elliptic Curve Cryptography (ECC) cryptographic algorithm on the at least one bit to obtain a randomized cryptographic algorithm and transform an elliptic curve in an original coordinate system into a transformed elliptic curve in a modified coordinate system using randomized coordinate values based on the at least one random number value; and
- a randomized cryptographic algorithm executing component, of the constant time cryptographic co-processor, configured to: decrypt the encrypted data by: executing the randomized cryptographic algorithm on the at least one bit of encrypted data to recover original data associated with the encrypted data, comprising:
- performing the ECC algorithm using the transformed elliptic curve; and
- modifying a result of the ECC algorithm to the original coordinate system;
- wherein the randomized cryptographic algorithm executing component is configured to execute a number of dummy cycles during the execution of the cryptographic algorithm, wherein the number of dummy cycles is based on a number of zeros of a scalar associated with one or more multiplication operations of the cryptographic algorithm.

* * * * *